June 30, 1970  F. LAURENTY  3,518,061
INSTALLATIONS FOR CRYSTALLIZATION OF A SUBSTANCE
IN SOLUTION, ESPECIALLY ANHYDROUS SODIUM SULFATE
Filed Nov. 16, 1966  3 Sheets-Sheet 1

INVENTOR
FRANÇOIS LAURENTY
BY Young + Thompson
ATTYS.

June 30, 1970  F. LAURENTY  3,518,061
INSTALLATIONS FOR CRYSTALLIZATION OF A SUBSTANCE
IN SOLUTION, ESPECIALLY ANHYDROUS SODIUM SULFATE
Filed Nov. 16, 1966  3 Sheets-Sheet 2

INVENTOR
FRANÇOIS LAURENTY
BY Young + Thompson
ATTYS

United States Patent Office 3,518,061
Patented June 30, 1970

3,518,061
INSTALLATIONS FOR CRYSTALLIZATION OF A SUBSTANCE IN SOLUTION, ESPECIALLY ANHYDROUS SODIUM SULFATE
François Laurenty, Le Champignon,
62 Le Touquet-Paris-Plage, France
Filed Nov. 16, 1966, Ser. No. 594,779
Claims priority, application France, Mar. 29, 1966,
55,379; Nov. 3, 1966, 82,310
Int. Cl. B01d 9/02; C01d 5/16
U.S. Cl. 23—273    4 Claims

ABSTRACT OF THE DISCLOSURE

Anhydrous sodium sulfate is crystallized from solution in a vessel that feeds an evaporating circuit and a drying circuit. The drying circuit includes a decanter fed from the vessel, a dryer fed by the bottoms of the decanter, and two branch conduits one of which feeds liquid from the decanter in bypass relation to the dryer and the other of which is fed by liquid from the dryer. All or part of the liquid from the bypass conduits is returned to the evaporating circuit or to a point in the vessel adjacent the intake of the evaporating circuit.

---

The present invention concerns installations for crystallization of a substance in solution, of the kind including, connected to a same intermediate vessel supplied with the solution to be crystallized, on one hand an evaporating-circuit in which optimum crystallization conditions prevail and of which the evaporating residue is recycled continuously in the aforesaid vessel, and, on the other hand, a drying-circuit that performs the separation of the crystallized substance and of which the drying residue is also recycled continuously in the intermediate vessel; the invention aims in particular at the adaptation of installations of this kind to the crystallization of anhydrous sodium sulfate.

As is well-known, it is hardly possible at this time, with such installations, to obtain anhydrous sodium sulfate crystals having a diameter greater than 100 microns.

However the sieves that it is necessary to use in the drying-circuit become more irregular as their meshes become smaller and consequently the diameters of the crystals of the product obtained are all the more irregular the smaller they become. It is, of course, important to obtain crystals of a diameter as great as possible, within certain limits; in fact, only a regular product, having crystals of relatively great diameter, allows the use of a drying installation to the best of its efficiency, and presents an angle of repose small enough to avoid the formation of blockages in storage silos.

In present crystallization installations, quite a number of factors tend to limit the diameter of the crystals formed.

First of all, crystals already formed, but too thin to be retained in the drying-circuit, stay much too long in the stagnant volume of the intermediate vessel, before being taken back into the evaporating-circuit. Such an extended stay in the intermediate vessel does not contribute at all to the enlargement of the crystals, but on the contrary, and especially for anhydrous sodium sulfate of which the dissolution-heat is negative, this stay is rather a nuisance, as in most cases the vessels are neither heated nor even heat insulated.

Furthermore, it frequently occurs that the crystals decantation-speed in the intermediate vessel after a first recycling, is greater than the rising speed of the crystals in the same vessel and that the crystals are not taken back into the evaporating-circuit for further recycling. It may also be shown that a far from negligible part of the evaporating-circuit residue is directed towards the evaporating-circuit inlet, to the detriment of the remainder of the contents of the intermediate vessel since the volume supplied by the evaporating circuit is the same; as a result of course the general rising speed of the contents of the vessel is lessened.

On an other hand, from another aspect of the problem, in order to obtain crystals of given size, it is necessary, for a constant hourly production, to limit the number of small crystals that are being produced at any point within the installation. Indeed, as is well known, the number of small crystals necessary for the production of crystals of a given diameter, is one thousand times smaller than the number of small crystals, for the same hourly production, necessary for obtaining ten times bigger crystals. In known crystallization installations however there are many zones having supersaturated and calm surfaces, tending to facilitate the unwanted formation of too many small crystals.

The object of the present invention is to provide improvements in the aforesaid crystallization installations allowing them to produce crystals of diameter many times bigger than those presently made, these diameters being preferably also regulable with regard to their eventual working conditions for example.

In accordance with one of the improvements according to the invention, a part at least of the drying residue is directed along a branch path to the vicinity of the intake of the evaporating circuit.

This arrangement helps to increase the number of crystals passing into the evaporating circuit during a given length of time, and thus to increase the ultimate diameter of the crystals, the evaporating circuit being the only volume actually active for crystallization.

Other aims of the present invention are improvements enabling, for the contents of the intermediate vessel, the same speed of ascent in all parts of the vessel to be attained, which speed is higher than the decantation speed, and on the other hand, to control, and even prevent, the formation of small crystals at the places in the apparatus where this formation is most likely to take place, and where it is unwanted.

The different arrangements of the invention allow crystals of a diameter greater than the crystals produced in known crystallization installations to be obtained.

Characteristic aims of the invention will be made clear from the following description, given by way of example, with reference to the accompanying diagrammatic drawings in which.

Figure 1:
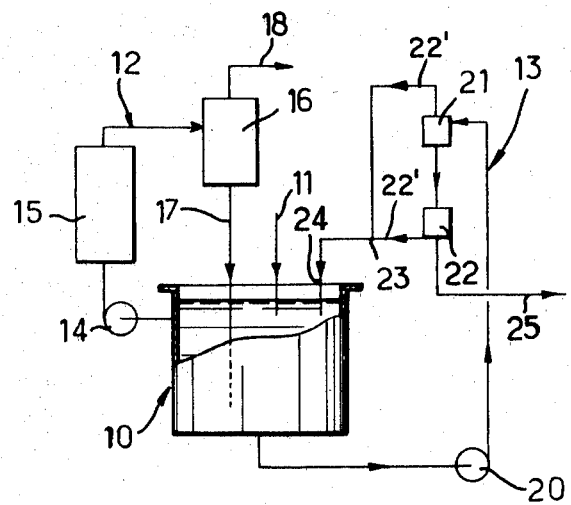
FIG. 1 is a diagram of a known crystallization installation.
Figure 2:
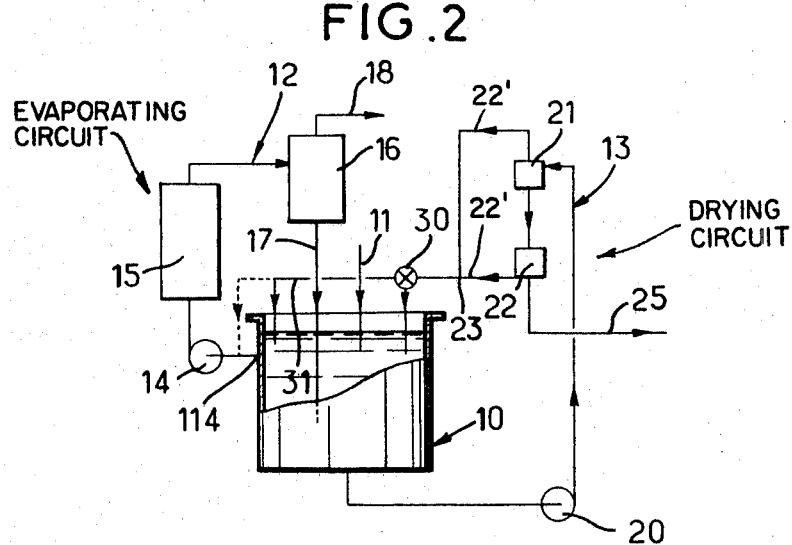
FIG. 2 is a diagram of such an installation modified according to one of the improvements of the invention.

In FIGS. 1 and 2, an intermediate vessel 10 is schematically shown, supplied with, at 11, the material to be crystallized; an evaporating-circuit 12 and a drying-circuit 13 are connected to the vessel 10.

As an example, such an evaporating-circuit 12 includes a circulation pump 14, a heater 15 and an evaporator 16 of which the residue that is to say the unevaporated liquid part, is returned to the vessel 10 through a pipe 17, and of which the steam produced is taken out at 18 to a condenser not shown. Such an evaporating-circuit produces the best crystallization conditions for a substance such as anhydrous sodium sulfate since, on one hand, the temperature of the solution to be treated is increased in the heater 15, and, on another hand, the percentage of water in the solution is lowered by the removal of steam in the evaporator 16.

To make the drawing readable, it has been necessary to give to the volume of the evaporating-circuit 12 a size substantially equal to the size of vessel 10. But it is important to note that such is not in fact the case. In practice, if the volume of vessel 10 is taken to be 100 V, V being for instance the volume supplied per second by the circulating-pump 14, the total volume of the evaporating-circuit is seldom greater than 20 V.

The drying-circuit 13 includes a circulating-pump 20, a decanter 21, and a drying-unit 22 fed by the decanter 21. The liquid and solid residue of decanter 21, mixed or not at 23 with that of the drying-unit 22, returns at 24 to the intermediate vessel 10 at a point which is, most often very far from the intake of the pump 14, whereas the material retained by the drying-unit basket is ejected at 25.

The total volume of the drying-circuit is also very small in relation to that of the vessel 10. Very often, it is even smaller than V, which is the discharge per second of pump 15, whereas the discharge of pump 20 is only about a sixtieth part of that of pump 14.

As will be easily understood, under these conditions, the length of stay of the treated material in the vessel 10 is greatly preponderant with respect to the respective lengths of time the material remains in the evaporating-circuit and in the drying-circuit.

Consequently, in the course of a given length of time, such as one hour for example, the number of recycling movements in the evaporation-circuit, which is the only efficient one, is relatively small.

In order to increase considerably the number of recycling movements, means are provided, in accordance with one of the improvements according to the invention, to connect the drying circuit more directly to the evaporating circuit. These means comprise a first branch conduit 21', which, as is shown in FIGS. 1 and 2, is fed by the residue of the decanter 21 and bypasses the drying unit 22. These means also comprise a second branch conduit 22' which is fed by the drying unit 22. The branch conduits 21' and 22', in the arrangement of the present invention according to FIG. 2, both feed to a cock 30, which in turn can divert all or any part of the residue of the drying circuit through a conduit 31 to the vicinity of the intake 114 of pump 14, so that the residue will be immediately taken in again by the evaporating-circuit without first remaining in the intermediate vessel 10. Thus the crystals, too thin to be retained in the drying-unit basket will grow very quickly, by virtue on the one hand of an increased number of journeys through the evaporating-circuit, as stated above, and on the other hand because the crystals do not remain in the vessel 10 whereas has been seen the unavoidable losses of heat are prejudicial to their growth.

In the example quoted above, if the whole of the drying-unit residue is taken in again by the conduit 31, the number of recycling movements of crystals in the evaporating-circuit is in the proportion 100V/20V=5 with respect to the number obtained in a conventional installation, and the ultimate diameter of crystals will thus be between one and five times the diameter of crystals produced in the conventional installation.

By turning cock 30, it is possible to vary the percentage of drying residue diverted, and thus to regulate the ultimate diameter of crystals produced.

Of course, in any case the basket of the drying-unit 22 has to be chosen accordingly.

Figure 3:
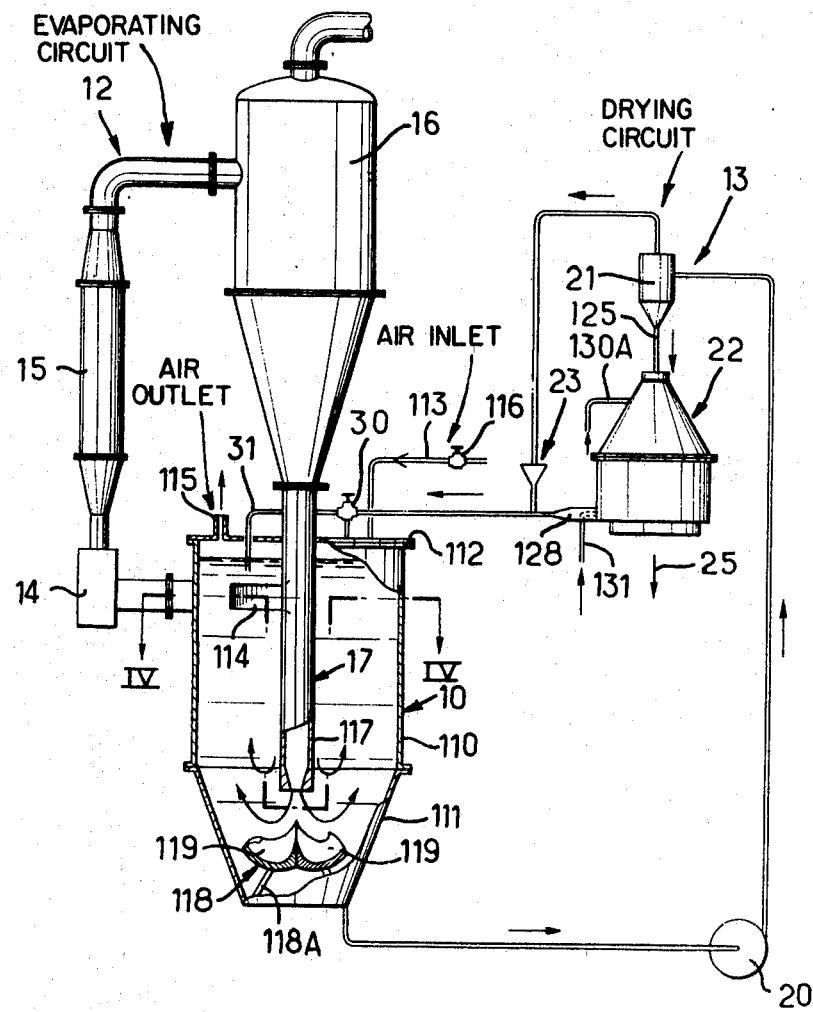
FIG. 3 is a general view of a further installation provided with other improvements according to the invention, certain components being shown in section.

Very often, it will be enough to direct the diversion conduit 31 in the tub 10 to the vicinity of the intake 114 of pump 14, as shown in full lines in FIG. 3. However, sometimes it may be better to connect directly the diversion path 31 to the intake conduit of the pump 14, as shown in dotted lines on FIG. 2.

FIG. 3 shows a crystallization of the kind described above. This installation includes an intermediate vessel 10 into which the material to be crystallized is introduced, an evaporating circuit 12 including a pump 14, a heater 15 and an evaporator 16, and a drying circuit 13 including a pump 20, a decanter 21 of the hydrocyclone kind and a drying-unit 22.

In the embodiment shown, the vessel 10 includes a cylindrical portion 110, closed at its lower end by a conical section 111, from the bottom of which the intake of the circulating-pump is connected to the drying-circuit.

On its upper part the vessel 10 is closed by a lid 112, provided with an air intake tube 113 and with an air outlet tube 115. On 113 is interposed a tap system 116 and the intake of air may or may not be pulsed.

The return of the liquid residue of the drying-circuit is shown at 31; this return is regulated by a sluice 30, which directs the whole or a part of it to the vicinity of the intake connection 114 of circulating-pump 14 of the evaporating-circuit; this connection, according to the present invention, is set tangentially with respect to the cylindrical portion 110 of the intermediate vessel.

Along the axis of the vessel 10 is disposed a system of pipes 17 through which enters the residue of the evaporating-circuit. The unconnected end 117 of the system of pipes 17 is located as far away as possible from the intake 114 of the evaporating-circuit so as to reduce or even eliminate any direct passage of the evaporation residue into the intake 114 of the evaporating-circuit. Furthermore, in order to increase the entry speed of the evaporating residue in vessel 10, the inner diameter of the system of pipes in progressively reduced.

Moreover, and according to the invention, at the end 117 of the system of pipes 17 is positioned a deflector 118 connected by feet 118A to the conical section 111 and presenting blades or vanes 119, which are bent upwardly and which when viewed horizontally have a spiral appearance.

Figure 4:
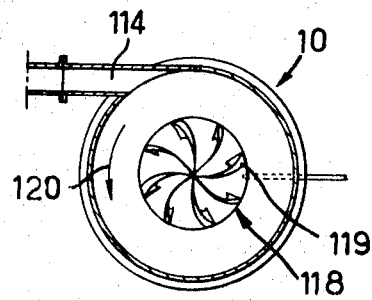
FIG. 4 is a view, in section, of this installation, along the line IV—IV of FIG. 3.

This deflector takes into account the entry speed into the tank of the evaporation residue and in combination with the tangential disposition of the intake connection 114, helps to impart to the residue of the evaporating-circuit a gyratory motion on entry into the vessel 10, as shown by the arrow 120 in FIG. 4. This gyratory motion 15 of such a nature that it promotes uniformity of circulation conditions in the vessel 10 as well as increasing the general speed of ascent of the crystals. In this way the speed of ascent is kept higher than the decantation speed of the crystals smaller than those wanted; the biggest crystals decant only on the lower conical trunk and are carried away to the intake of pump 20, which is preferably disposed on the side of the small end of the conical trunk, and sometimes tangentially.

Figure 5:
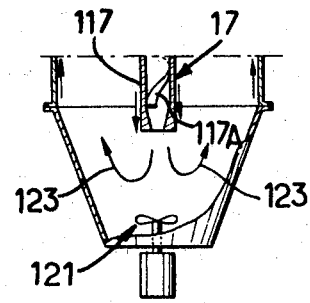
FIG. 5 is a view partly in section, of another embodiment of the intermediate vessel of the installation.

FIG. 5 shows how the same result is obtained by providing the bottom of vessel 10 with an agitator 121 creating a general motion of descent towards the centre of vessel 10 and a general motion of ascent along the peripheral walls 110 and 111 of the vessel as shown by arrows 123 of FIG. 5.

In this embodiment, the end of the system of pipes 17 is provided in its interior with helical deflectors imparting a gyratory motion to the evaporating residue when this enters the intermediate vessel.

Figure 6:
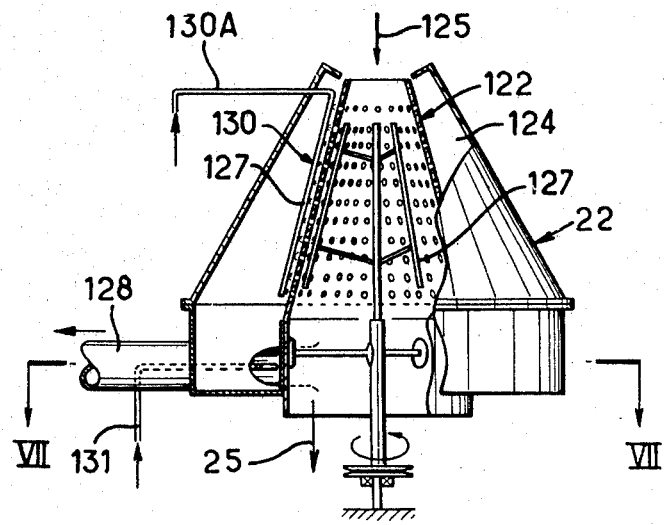
FIG. 6 is a view, partly in section, of a drying unit in place in the installation according to the invention.
Figure 7:
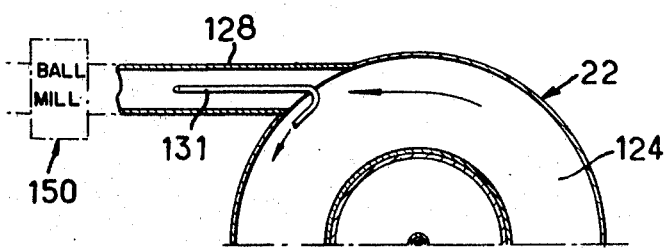
FIG. 7 is an half-view, in section, of this drying unit along the line VII—VII of FIG. 6.

FIGS. 6 and 7 show diagrammatically the drying-unit 22 which incldes, as is well known, a conical sieve 122 rotating in a container 124. The liquor to be dried enters at 125 along the sieve axis 122 and this assures segregation between a thick body falling from the drying-unit and a liquid liquor that is just the drying-up residue, carried away from the container 124 by a pipe 128 connected to cock 30. There are shown diagrammatically at 127 the scrapers usually provided in drying-units of this kind.

According to the invention, there are associated with the sieve 122 of the drying-unit one or more liquid-spraying devices 130 arranged in the vicinity of the outer wall of the sieve, in a direction parallel to the generatrice of the latter. This or these devices 130 are connected to a supply-tube 130A and present pulverization delivery holes throwing an unsaturated liquor, water or steam against the wall of sieve 132. Through a tube 131 is brought into the container 124, in a zone where the crystals that have passed through the sieve are inclined to collect, unsaturated liquor of the kind supplying the evaporating-circuit or that coming back from the drying-circuit; this tube 131 is disposed within the pipe 12.

These arrangements as well as those regulating the supply of air above the free surface of the liquid in vessel 10 have as a result, as will be explained below, to control or even to eliminate the formation of small crystals in the parts of the installation where their formation is the more likely to take place; that is to say in the calm zones where the liquor is supersaturated and where the mechanical friction is small or even non-existent; these are the liquid surface in contact with air in the vessel, the outlet for the liquid that has been dried by the sieve 122, and the calm zones of the container 124.

On the contrary, at every point of the circuit where there is little supersaturation and where there is a great deal of mechanical friction causing speed variations in the liquid, for instance in pump 14, in the heat-exchanger 15, and in tube 17, such a formation of small crystals can be tolerated.

By fitting at 113, according to the invention, an air inlet and providing means for regulating the speed and rate of discharge of the air passing therethrough and possibly pulsing it in a zone particularly favourable to the formation of small crystals, it is possible to lower or increase, and thus generally regulate at will the number of small crystals produced per unit of time in that zone.

Beyond the holes of the sieve where the outgoing liquid is supersaturated, there normally takes place an important formation of small crystals. Any time the number of these small crystals is not higher than the wanted number, it is possible to let them be produced, and any time their number is too high, it is possible to suppress them by setting in operation the pulverising spraying devices 130 according to the invention. Also by regulating the amount of unsaturated liquor entering the container of the drying-unit at 131, it is possible to suppress any possible deposit of crystals in that zone. These different arrangements permit an approach to working conditions by which there is practically no unwanted formation of small crystals.

Alternatively, it is possible to provide a grinder, for instance a ball-mill at the outlet 128 of the drying-unit 22. The arrangement, whilst avoiding too large a formation of very small crystals, allows a number of crystals of medium diameter to be retained, that is to say those having a sufficient crystallization surface, especially in the case where small crystals would have entirely disappeared in the installation. Such a grinder, being well-known, is shown, in dash-dotted lines, at 150, in FIG. 7.

Again the grinder may be disposed as a by-pass in any circuit containing crystals.

Of course, the present invention is not limited to the embodiments chosen and shown, but includes all other possible embodiments.

What I claim is:

1. Apparatus for the crystallization of a substance in solution, said apparatus comprising:
   (a) a vessel for the solution to be crystallized;
   (b) evaporation means having an intake connected to said vessel;
   (c) and drying means for separating the crystallized material, said drying means comprising: an intake connected to the said vessel; a decanter connected to the said intake; a dryer fed by said decanter; a first branch conduit fed by the residue of said decanter to return said residue to said vessel, said first branch conduit bypassing said dryer; a second branch conduit fed by the residue of said dryer to return said residue to said vessel; and a third conduit connected to said first and second branch conduits to return at least a part of the said residues to the immediate vicinity of said intake of said evaporation means, said drying means including a dryer comprising a collecting container, a rotatable sieve disposed within the container, the liquor to be dried being introduced along the axis of said sieve, said container having disposed therein, in the vicinity of the said sieve, at least one liquid spraying device throwing out on the outer wall of the sieve along a generatrix of that wall, saturated steam or water.

2. Apparatus according to claim 1, including an inlet for unsaturated liquor at the bottom portion of the collecting container.

3. Apparatus according to claim 2, further comprising a ball-mill fed by big crystals and returning finer crystals to the said evaporation means.

4. Apparatus according to claim 3, wherein the said ball-mill is located in the said second branch conduit, which is fed by the residue of the dryer.

References Cited

UNITED STATES PATENTS

| | | | |
|---|---|---|---|
| 743,352 | 11/1903 | Trump | 159—45 XR |
| 1,945,281 | 1/1934 | Leithauser | 159—45 XR |
| 2,567,968 | 9/1951 | Saeman | 23—273 XR |
| 2,602,023 | 7/1952 | Simms | 23—273 XR |
| 2,671,716 | 3/1954 | Ayres | 23—273 XR |
| 3,257,176 | 6/1966 | Nakai | 23—273 XR |
| 3,259,171 | 7/1966 | Siemssen. | |
| 3,273,630 | 9/1966 | Kuhnlein. | |
| 3,370,635 | 2/1968 | Kumm. | |

NORMAN YUDKOFF, Primary Examiner

C. P. RIBANDO, Assistant Examiner

U.S. Cl. X.R.

23—121; 159—45